United States Patent
Sullivan, Sr. et al.

(10) Patent No.: US 6,409,150 B2
(45) Date of Patent: Jun. 25, 2002

(54) PIN VALVE WITH REMOVABLE VALVE BODY COVER

(76) Inventors: Dennis J. Sullivan, Sr., 9077 Reales St., Alta Loma, CA (US) 91737; Dennis J. Sullivan, Jr., 145 S. Rennell, San Dimas, CA (US) 91773

(*) Notice: Subject to any disclaimer, the term of this patent is extended or adjusted under 35 U.S.C. 154(b) by 0 days.

(21) Appl. No.: 09/354,518

(22) Filed: Jul. 14, 1999

(51) Int. Cl.[7] .......................... F41B 11/00; F16K 51/00
(52) U.S. Cl. ...................... 251/360; 124/73; 137/15.17
(58) Field of Search ................................ 257/360, 363, 257/321, 322; 137/15.17, 15.18, 15.08; 124/73

(56) References Cited

U.S. PATENT DOCUMENTS

| | | | | |
|---|---|---|---|---|
| 6,464 A | * | 6/1849 | Hopkins | ..................... 251/321 |
| 1,171,369 A | * | 2/1916 | Topping | ................. 251/360 X |
| 1,326,430 A | * | 12/1919 | Walsh | .................... 251/360 X |
| 2,230,806 A | * | 2/1941 | Lohmolder | ............. 251/360 X |
| 2,445,505 A | * | 7/1948 | Ashton | .................... 251/363 X |
| 2,583,291 A | * | 1/1952 | Beem | ...................... 251/360 X |
| 2,612,342 A | * | 9/1952 | Terry | ...................... 251/321 X |
| 3,038,487 A | * | 6/1962 | Gardner | .................. 251/363 X |
| 3,107,082 A | * | 10/1963 | Reynolds | ................ 251/363 X |
| 3,544,065 A | * | 12/1970 | Mercier | ................... 251/321 X |
| 3,746,305 A | * | 7/1973 | Zakka | ......................... 251/360 |
| 4,171,119 A | * | 10/1979 | Lamson | ......................... 251/321 |
| 4,183,501 A | * | 1/1980 | Flynn | ..................... 251/360 X |
| 4,779,642 A | * | 10/1988 | Wood et al. | ............ 251/122 X |
| 4,834,337 A | * | 5/1989 | Chorkey et al. | ........ 251/129.18 |
| 5,029,734 A | * | 7/1991 | Nichols | ...................... 222/105 |
| 5,139,042 A | * | 8/1992 | Calhoun | .................. 137/15.17 |
| 5,341,844 A | * | 8/1994 | Wass et al. | ............ 251/129.15 |
| 5,628,489 A | * | 5/1997 | Woodman | .................. 251/43 X |
| 5,791,328 A | * | 8/1998 | Alexander | .............. 251/321 X |
| 5,878,736 A | * | 3/1999 | Lotuaco, III | .............. 124/71 X |

* cited by examiner

Primary Examiner—Henry C. Yuen
Assistant Examiner—John Bastianelli
(74) Attorney, Agent, or Firm—Shenton & Mak; Denton L. Anderson

(57) ABSTRACT

The invention is a pin valve having a detachable valve body cover which makes the valve stem assembly accessible from the end of the valve in which the valve stem protrudes. The removable valve body cover can be replaced independently if this end of the valve is damaged. The valve body cover also has a valve seat which is more accessible and is more easily machined. The valve body cover is typically adapted to accommodate an allen wrench type tool to simplify removal and reattachment. The invention eliminates the need to disconnect the valve at the second open end when replacing the valve stem assembly.

14 Claims, 2 Drawing Sheets

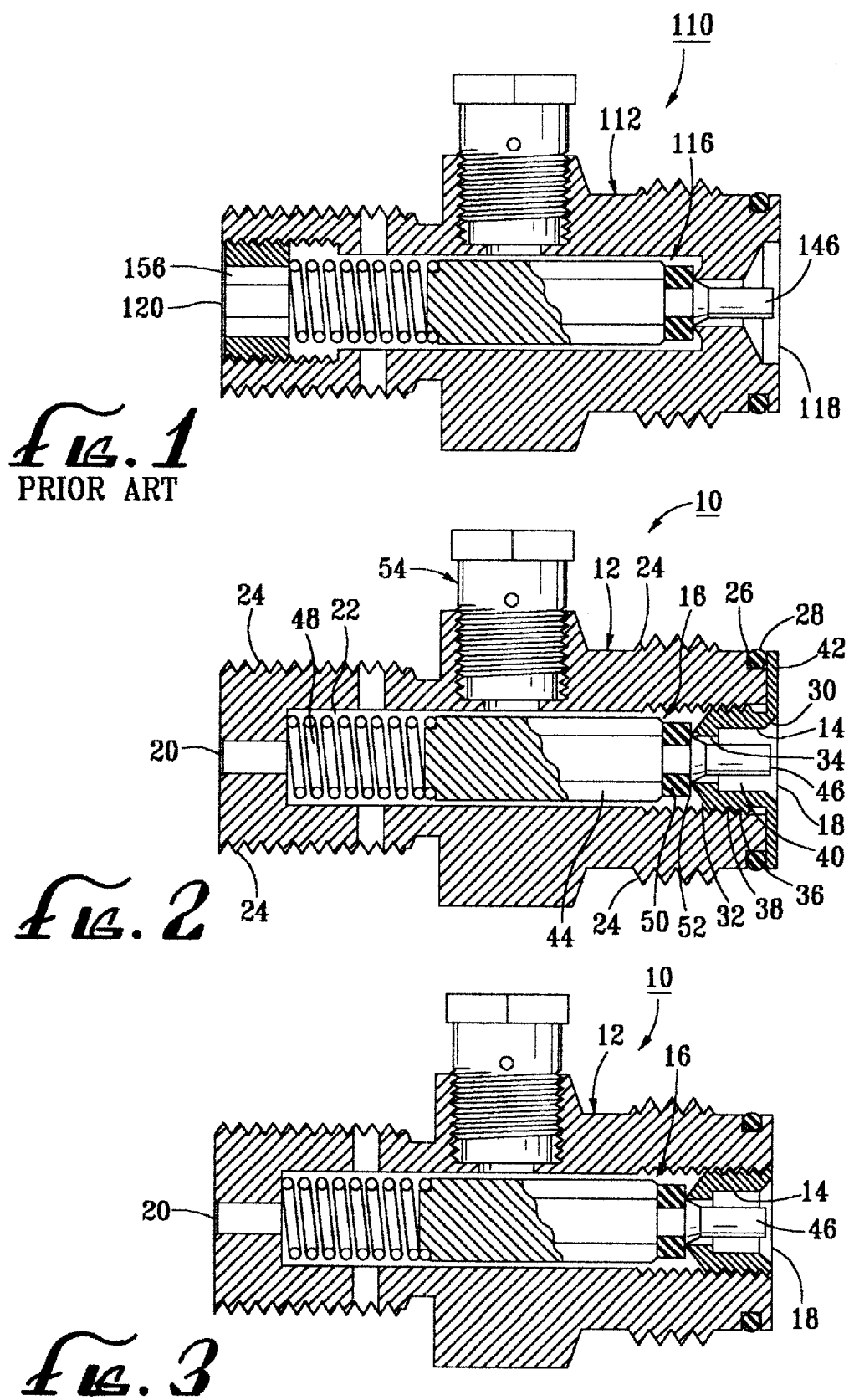

PIN VALVE WITH REMOVABLE VALVE BODY COVER

FIELD OF THE INVENTION

This invention relates generally to valves, and, more specifically to pin valves.

BACKGROUND OF THE INVENTION

Pin valves have been in existence for a quite some time and have been used for a multiplicity of purposes. Within the last 15 to 20 years pin valves have been adapted to be used in gas powered guns suitable for projecting paint balls. These type of guns have become popular for use in simulated combat games. Pin valves are an important component of these guns because they provide a removable connection between the gun and a high pressure gas source such as a $CO_2$ tank. The pin valve enables the $CO_2$ tank to be easily detached from the gun when the gun is not in use or when the $CO_2$ tank requires recharging.

As shown in FIG. 1, a prior art pin valve typically comprises a substantially cylindrical valve body having a first open end, a second open end, and an internal valve chamber in flow through connection with the first open end and the second open end. In a typical application, the first open end of the valve is connected to a paint ball gun, while the second open end is connected to a $CO_2$ tank. A valve stem assembly is disposed within the internal valve chamber. The valve stem assembly in a prior art pin valve may be accessed and removed only through an access opening in the second open end of the valve body. The valve stem protrudes through a valve stem opening in the first open end of the valve body. The valve stem moves between a retracted position where the valve is open and an extended position where the valve is closed. The valve stem is biased toward the extended position such that the valve stem protrudes through the valve stem opening in the valve body and a O-ring seal surrounding the valve stem is in sealing contact with a valve seat located on the inner surface of the internal valve chamber proximal to the first open end of the valve body. The pin valve is opened when the valve stem is depressed and moved to the retracted position such as by being connected to a paint ball gun at the first open end of the pin valve.

The first open end of the pin valve is typically disconnected from the paint ball gun when the gun is not in use. The valve stem is in the extended position and the valve is closed when the first open end is disconnected. Unfortunately, when the first open end of the pin valve is disconnected from the paint ball gun it becomes exposed and is easily dented or otherwise damaged. If the first open end of the valve is dented, for example by hitting a solid object such as a concrete curb or a truck bed wall, it can result in damage to the valve stem or the inability to form an air-tight seal at this perimeter of the valve. The result is a pin valve that leaks.

Also, valve stems sometimes leak because of a poor seal between the O-ring and the valve seat. This problem frequently arises because of the difficulty in forming a proper valve seat surface during the manufacture of prior art pin valves. In order to have a valve that does not leak, it is vital that the surface of the valve seat is machined properly so that the valve seat has a sufficiently smooth and contiguous surface. Unfortunately, the valve seat surface is difficult to access in a prior art pin valve because it is disposed within the internal valve chamber at the opposite end of the cylindrical valve body from the access opening. The result is that many valve seat surfaces are imprecisely machined and a undue number of new valves need to be discarded prematurely because they leak.

A problem with prior art valves is that they are not amenable to being repaired. In fact, the valves currently used in paint ball guns are one of the most commonly replaced parts of the paint ball gun because they are not easily repaired. A particular problem is that replacement of the valve stem is difficult and time consuming. As shown in the prior art valve in FIG. 1, the valve stem assembly must be removed and replaced from the access opening in the second open end of the valve body. This requires that the entire valve be disconnected from the $CO_2$ tank. Disconnecting the second open end of the valve is difficult because the threaded connection is typically fixed to the $CO_2$ tank by the application of a special sealant material. The sealant acts to physically secure the connection between the valve and the $CO_2$ tank and to prevent leaks at this junction. This sealant can be difficult to properly apply, and is even more difficult to remove when disconnecting the valve. Breaking this seal usually requires that the connection between the valve and the $CO_2$ tank be heated to loosen the previously applied sealant. When a valve is reconnected it is important that the sealant material be properly applied because the connection may otherwise leak or pose a safety hazard. However, the sealant material may not be readily available when the valve needs to be replaced. Moreover, application of the sealant material entails a requisite level of skill not possessed by many persons owning or servicing the gun. Improper application of the sealant material, or failure to use the sealant material, can result in a safety hazard because the back end of the valve may become unscrewed when disconnecting the first end of the valve.

A further problem with prior art valves is that damage to the face of the first end typically requires that the entire valve be replaced. As shown in the prior art valve illustrated in FIG. 1, the face of the first end where the valve stem protrudes is integral with the first end of the valve body. When this face is dented the valve must often be replaced in its entirety rather than being repaired because the face is integral with the valve body. Needless to say, replacement of the entire pin valve is this is not a cost effective approach to maintaining the valve in proper working condition.

There is therefore a need for a valve which is easier to manufacture, easier to repair, and allows the valve stem assembly to be replaced directly from the first open end of the valve body.

SUMMARY

The invention satisfies this need. The invention is an improved valve which is more easily repaired, and which is suitable for being used in a gas propelled paint ball gun for connecting the gun to a pressurized gas source.

The invention comprises:

(a) a valve body having first and second open ends;

(b) a valve body cover reversibly attached to the first end of the valve body, the valve body and the valve body cover cooperating to define an internal valve chamber, the valve body cover having an external face, an internal face and a valve stem opening, the internal face of the valve body cover comprising a valve seat; and (c) a valve stem assembly disposed within the valve chamber, the valve stem assembly comprising a valve stem body, a valve stem attached to the valve stem body and a valve stem seal, the valve stem being movable between a retracted valve stem position and an extended valve stem position and being biased toward the extended valve stem position, the valve stem assembly being disposed within the valve chamber such that, (i) when the valve stem is in the extended valve stem position, the valve stem protrudes through the valve stem opening in the valve body cover and the valve stem seal is in sealing contact with the valve seat so as to seal closed the valve stem opening, and (ii) when the valve stem is in the retracted valve stem position, the valve stem seal is spaced apart from the valve seat sufficient so that the valve stem opening is not sealed closed.

The detachable valve body cover at the first open end of the valve body enables the valve stem assembly to be replaced directly from the first open end of the valve body, and thus virtually eliminates the need to disconnect the valve at the second open end. The valve seat surface is readily machined to form a smooth surface because it is disposed on the inner surface of the separately machined valve body cover. In a preferred embodiment, the removable valve body cover protects the first open end of the valve body and can be replaced independently if damaged. The removal of the valve body cover is simplified by designing the external face of the valve body cover such that it accommodates an allen wrench type tool.

DRAWINGS

These features, aspects and advantages of the present invention will become better understood with regard to the following description, appended claims and accompanying figures where:

FIG. 1 is cross-sectional view of a prior art pin valve;

FIG. 2 is a cross-sectional view of a first embodiment having features of the invention;

FIG. 3 is a cross-sectional view of a second embodiment having features of the invention.

DETAILED DESCRIPTION

Figure 4:
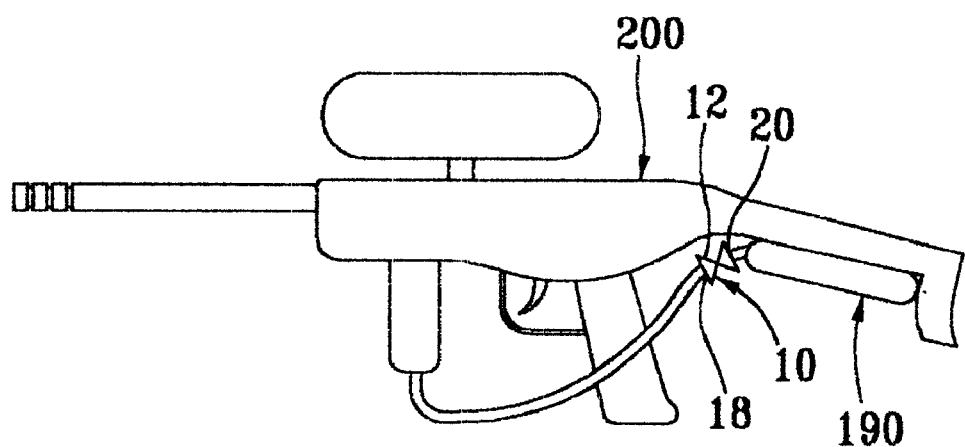
FIG. 4 is a side view of a combination having features of the invention.

The following discussion describes in detail two embodiments of the invention and several variations of those embodiments. This discussion should not be construed, however, as limiting the invention to those particular embodiments. Practitioners skilled in the art will recognize numerous other embodiments as well. For example, the valves described herein are not limited to being used in gas propelled paint ball guns and may be used in connection with other equipment and devices.

The invention is a pin valve 10 comprising a valve body 12, a valve body cover 14, and a valve stem assembly 16.

The valve body 12 is substantially cylindrical and comprises a first open end 18 which is in flow through contact with a second open end 20. The valve body 12 and the valve body cover 14 cooperate to define an internal valve chamber 22 that is disposed within the valve body 12. The internal valve chamber 22 is typically cylindrical. As illustrated in the embodiments in drawings, the valve body 12 preferably comprises external threads 24 proximal to the first open end 18 and proximal to the second open end 20 to enable the pin valve 10 to be connected to appropriate connectors at each end of the valve body 12. In the embodiments illustrated in drawings, the valve body 12 further comprises a recessed lip 26 at the radial perimeter of the valve body 12 at the first open end 18 which accommodates a first open end O-ring 28. The first open end O-ring 28 is sized and dimensioned such that it protrudes slightly from the radial perimeter of the valve body 12 and facilitates the formation of an air tight seal between the first open end 18 and an appropriate connector. In a typical embodiment, the diameter of the valve body 12 is between about ½ inches and about 1 inches and the length of the valve body 12 along it's longitudinal axis is between about 1 inches and about 3 inches.

The valve body cover 14 is attached to the first open end 18 of the valve body 12 and comprises an external face 30, an internal face 32, and a valve stem opening 34. Preferably, the valve body cover 14 reversibly attaches to the valve body 12, such as by a threaded connection. As illustrated in the embodiments in the drawings, the valve body cover 14 comprises external valve body cover threads 36 disposed between the external face 30 and the internal face 32. In these embodiments, the internal valve chamber 22 further comprises chamber threads 38 that accommodate the valve body cover threads 36.

The external face 30 of the valve body cover 14 typically comprises a valve body cover orifice 40 which is sized and dimensioned to accommodate an allen wrench tool. As used herein, the form of an allen wrench tool is meant to be interpreted broadly to include all tools which are suitable for applying torque to attach and detach the threaded valve body cover 14, including, for example, screwdrivers. A typical allen wrench tool is an L-shaped tool with at least one end terminating in a bit having the cross section shape of a hexagon, pentagon, octagon, or square.

In the embodiment illustrated in FIG. 2, the external face 30 of the valve body cover 14 comprises a flange 42 that substantially covers the first open end 18 of the valve body 12. Typically, the flange 42 is circular and is sized and dimensioned to substantially cover the first open end 18 of the valve body 12. Typically, the thickness of the flange 42 is between about 0.030 inches and about 0.070 inches. In the embodiment illustrated in FIG. 2, the first open end O-ring 28 is disposed between the flange 42 of i the valve body cover 14 and the recessed lip 26 of the valve body 12. The embodiment in FIG. 2 is distinguishable from the embodiment illustrated in FIG. 3, in which the external face 30 of the valve body cover 14 does not comprise a flange 42.

The valve stem assembly 16 is disposed within the internal valve chamber 22. The valve stem assembly 16 comprises a valve stem body 44 and a valve stem 46 that is attached to the valve stem body 44. The valve stem 46 is capable of moving back and forth between a retracted valve stem position and an extended valve stem position. The valve stem 46 is biased toward the extended valve stem position. As illustrated in the embodiments in the drawings, the valve stem 46 is preferably fixedly attached to the valve stem body 44. In these embodiments, there is a spring 48 disposed within the internal valve chamber 22 proximal to the second open end 20 of the valve body 12. The spring 48 places a biasing force upon the valve stem body 44 and valve stem 46 directed toward the valve stem opening 34. It is the force from this spring 48 which biases the valve stem 46 toward the extended valve stem position.

In an alternative embodiment, the valve stem assembly 16 comprises a stationary valve stem body 44 and a movable valve stem 46 that is attached to the valve stem body 44. Again, the valve stem 46 is capable of moving back and forth between a retracted valve stem position and an extended valve stem position. In this embodiment this is accomplished by placement of a spring within the valve stem body 44 that interacts with the valve stem 46 and places a force directed toward the valve stem opening 34 upon the valve stem 46. As the valve stem 46 is retracted, the portion of the valve stem 46 proximal to the stationary valve stem body 44 enters the valve stem body 44.

The valve stem assembly 16 further comprises a valve stem seal 50. As illustrated in the embodiments in the drawings, the valve stem seal 50 is preferably disposed radially about the valve stem 46 within the internal valve chamber 22. The internal face 32 of the valve body cover 14 further comprises a valve seat 52. The valve seat 52 is disposed within the internal valve chamber 22 on the internal face 32 of the valve body cover 14. As illustrated in the embodiments in drawings, the valve seat 52 is preferably radially disposed around the valve stem opening 34 such that it encircles the valve stem opening. In these embodiments, the valve stem seal 50 is preferably an O-ring disposed radially about the valve stem 46 and the O-ring type valve stem seal 50 is sized and dimensioned to seat in sealing relationship with the valve seat 52.

As illustrated in the embodiments in drawings, the valve stem assembly 16 is disposed within the internal valve chamber 22 such that, when the valve stem 46 is in the extended valve stem 46 position, the valve stem protrudes through the valve stem opening 34 in the valve body cover 14 and the valve stem seal 50 is in sealing contact with the valve seat 52 so as to seal closed the valve stem opening 34. Conversely, when the valve stem 46 is in the retracted valve stem position, the valve stem seal 50 becomes sufficiently spaced apart from the valve seat 52 so that the valve stem opening 34 is not sealed closed. The valve stem 46 is normally in the retracted position when the first open end 18 of the valve body 12 is attached to an appropriate connector.

As illustrated in the embodiments in the drawings, there is typically a safety relief member 54 attached by a threaded connection to the valve body 12 between the first open end 18 and the second open end 20. The safety relief member 54 connects with the internal valve chamber 22 to allow gas to escape when the pressure within the internal valve chamber 22 becomes too high.

The pin valve 10 described herein is distinguished from pin valves 110 of the prior art by the detachable valve body cover 14 attached to the first open end 18. As illustrated in FIG. 1, prior art pin valves 110 do not have a valve body cover 14 at the first open end 118. Instead, prior art pin valves 110 have an access opening 156 in the second open end 120 of the valve body 112.

The pin valve 10 is ideally used as a connection valve to connect a pressurized tank 190 to a pneumatically operated paint ball gun 200. As illustrated in FIG. 4, the second open end 20 of the valve body 12 is attached to the pressurized tank 190 and the first open end 18 of the valve body 12 is attached to the paint ball gun 200. In operation, a user repairs a pin valve 10 with a damaged valve stem 46 entirely from the first open end 18 simply by removing the valve body cover 14 with an alien wrench and replacing the valve stem assembly 16. Replacing the valve stem assembly 16 is much simpler with the pin valve 10 described herein in comparison to a prior art pin valve 110. With reference to the prior art pin valve 110 illustrated in FIG. 1, the valve stem assembly 116 cannot be removed from the first open end 118 of the valve body 112, but rather may be removed and replaced only through an access opening 156 in the second open end 120 of the valve body 112. Replacement of a valve stem 146 in a prior art pin valve 110 necessitates that the second open end 120 normally fixedly attached to a $CO_2$ tank by a special sealant be removed.

If the first open end 18 of the pin valve 10 is dented, the user repairs the embodiment of the invention illustrated in FIG. 2 by adding a new valve body cover 14 rather than replacing the entire pin valve 10. Again, the repair is performed from the first open end 18 of the pin valve 10 after the first open end 18 has been disconnected. The valve body cover 14 is easy to remove and reattach because it incorporates an opening for an alien wrench. A user wishing to remove the valve body cover 14 knows whether the pressurized gas source has been discharged prior to removing the valve body cover 14 because engagement of the alien wrench to detach the valve body cover 14 necessarily pushes the valve stem 46 to a retracted position and opens the pin valve 10. This eliminates the danger of accidentally removing the valve body cover 14 from the pin valve 10 when the pressurized gas source has not been discharged.

Finally, a user wishing to repair a defective valve seat 52 simply replaces the valve body cover 14. This repair is performed from the first open end 18 of the pin valve 10, rather than replacing the entire pin valve 10 or attempting to re-machine the valve seat 52 from the access opening at the second open end 20 of the pin valve 10. The user need not remove the fixedly attached second open end 20 of the pin valve 10 to perform this repair.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A method of repairing a connection valve in a pneumatically operated paint ball gun wherein the connection valve comprises a valve body, a valve body cover and a valve stem assembly disposed within the valve body and wherein the valve body cover has been damaged, the method comprising:
   (a) providing a pneumatically operated paint ball gun comprising:
      (i) a pressurized tank attached to the paint ball gun; and
      (ii) a connection valve connecting the pressurized tank to the paint ball gun, the connection valve comprising:
         (I) a valve body having first and second open ends;
         (II) a valve body cover reversibly attached to the first end of the valve body, the valve body and the valve body cover cooperating to define an internal valve chamber, the valve body cover having an external face, an internal face, a valve stem opening and a valve body cover orifice, the internal face of the valve body cover comprising a valve seat, the valve body cover orifice being sized and dimensioned to accommodate an allen wrench tool; and
         (III) a valve stem assembly disposed within the valve chamber, the valve stem assembly comprising a valve stem body, a valve stem attached to the valve stem body and a valve stem seal, the valve stem being movable between a retracted valve stem position and an extended valve stem position and being biased toward the extended valve stem position, the valve stem assembly being disposed within the valve chamber such that, (A) when the valve stem is in the extended valve stem position, the valve stem protrudes through the valve stem opening in the valve body cover into the valve body cover orifice and the valve stem seal is in sealing contact with the valve seat so as to seal closed the valve stem opening, and (B) when the valve stem is in the retracted valve stem position, the valve stem seal is spaced apart from the valve seat sufficient so that the valve stem opening is not sealed closed; and whereby, when the valve body cover is detached from the valve body using an allen wrench tool, the valve stem is moved to the retracted valve stem position, so that any pressure within the valve body is discharged through the valve stem opening;

(b) depressurizing the pressurized tank by inserting an allen wrench tool into the valve body cover orifice;

(c) removing the valve body cover by rotating the valve body cover with the allen wrench tool used in step (b); and (d) installing a new, undamaged valve body cover onto the valve body by rotating the new valve body cover using the allen wrench tool used in step (b).

2. The method of claim 1 wherein the external face of the valve body cover comprises a flange that substantially covers the first open end of the valve body.

3. The method of claim 1 wherein the thickness of the flange is between about 0.030 inches and about 0.070 inches.

4. The method of claim 1 wherein the valve stem seal is an O-ring disposed around the valve stem and wherein the valve seat is radially disposed around the valve stem opening.

5. The method of claim 1 wherein the valve body cover is attached to the valve body by a threaded connection.

6. The method of claim 1 wherein the valve body cover comprises external threads.

7. A method for replacing the valve stem assembly of a connection valve in a pneumatically operated paint ball gun, the method comprising:

(a) providing a pneumatically operated paint ball gun comprising:
  (i) a pressurized tank attached to the paint ball gun; and
  (ii) a connection valve connecting the pressurized tank to the paint ball gun, the connection valve comprising:
    (I) a valve body having first and second open ends;
    (II) a valve body cover reversibly attached to the first end of the valve body, the valve body and the valve body cover cooperating to define an internal valve chamber, the valve body cover having an external face, an internal face, a valve stem opening and a valve body cover orifice, the internal face of the valve body cover comprising a valve seat, the valve body cover orifice being sized and dimensioned to accommodate an allen wrench tool; and
    (III) a valve stem assembly disposed within the valve chamber, the valve stem assembly comprising a valve stem body, a valve stem attached to the valve stem body and a valve stem seal, the valve stem being movable between a retracted valve stem position and an extended valve stem position and being biased toward the extended valve stem position, the valve stem assembly being disposed within the valve chamber such that, (A) when the valve stem is in the extended valve stem position, the valve stem protrudes through the valve stem opening in the valve body cover into the valve body cover orifice and the valve stem seal is in sealing contact with the valve seat so as to seal closed the valve stem opening, and (B) when the valve stem is in the retracted valve stem position, the valve stem seal is spaced apart from the valve seat sufficient so that the valve stem opening is not sealed closed; and whereby, when the valve body cover is detached from the valve body using an allen wrench tool, the valve stem is moved to the retracted valve stem position, so that any pressure within the valve body is discharged through the valve stem opening;

(b) depressurizing the pressurized tank by inserting an allen wrench tool into the valve body cover orifice;

(c) removing the valve body cover by rotating the valve body cover with the allen wrench tool used in step (b);

(d) removing the existing valve stem assembly from the valve body and replacing the original valve stem assembly with a new valve stem assembly; and (e) reinstalling the valve body cover by rotating the valve body cover within the valve body using the allen wrench tool used in (b).

8. The method of claim 7 wherein the external face of the valve body cover comprises a flange that substantially covers the first open end of the valve body.

9. The method of claim 7 wherein the thickness of the flange is between about 0.030 inches and about 0.070 inches.

10. The method of claim 7 wherein the valve stem seal is an O-ring disposed around the valve stem and wherein the valve seat is radially disposed around the valve stem opening.

11. The method of claim 7 wherein the valve body cover is attached to the valve body by a threaded connection.

12. The method of claim 7 wherein the valve body cover comprises external threads.

13. A method for repairing a valve seat within a connection valve disposed between a pressurized tank and a pneumatically operated paint ball gun, the connection valve comprising (i) a valve body having first and second open ends, the first open end being in fluid tight communication with the paint ball gun and the second open end being in fluid tight communication with the pressurized tank, (ii) a valve body cover reversibly attached to the first end of the valve body, the valve body and the valve body cover cooperating to define an internal valve chamber, the valve body cover having an external face, an internal face, a valve stem opening and a valve body cover orifice, the internal face of the valve body cover comprising a valve seat, the valve body cover orifice being sized and dimensioned to accommodate an allen wrench tool, and (iii) a valve stem assembly disposed within the valve chamber, the valve stem assembly comprising a valve stem body, a valve stem attached to the valve stem body and a valve stem seal, the valve stem being movable between a retracted valve stem position and an extended valve stem position and being biased toward the extended valve stem position, the valve stem assembly being disposed within the valve chamber such that, (A) when the valve stem is in the extended valve stem position, the valve stem protrudes through the valve stem opening in the valve body cover into the valve body cover orifice and the valve stem seal is in sealing contact with the valve seat so as to seal closed the valve stem opening, and (B) when the valve stem is in the retracted valve stem position, the valve stem seal is spaced apart from the valve seat sufficient so that the valve stem opening is not sealed closed, the method comprising the steps of:

(a) disengaging the first open end of the valve body from the paint ball gun so as to expose the valve body cover orifice;

(b) pressing inwardly on the valve stem with an allen wrench tool to release any pressure within the valve body;

(c) engaging the allen wrench tool within the valve body cover orifice and rotating the allen wrench tool to remove the valve body cover orifice from the valve body, so as to expose the valve stem assembly;

(d) repairing the valve seat;

(e) reattaching the valve body cover to the valve body using the allen wrench tool; and (f) reattaching the first open end of the valve body in fluid tight communication with the paint ball gun.

14. A method for replacing the valve body cover on a connection valve disposed between a pressurized tank and a pneumatically operated paint ball gun, the connection valve comprising (i) a valve body having first and second open ends, the first open end being in fluid tight communication with the paint ball gun and the second open end being in fluid tight communication with the pressurized tank, (ii) a valve body cover reversibly attached to the first end of the valve body, the valve body and the valve body cover cooperating to define an internal valve chamber, the valve body cover having an external face, an internal face, a valve stem opening and a valve body cover orifice, the internal face of the valve body cover comprising a valve seat, the valve body cover orifice being sized-and dimensioned to accommodate an allen wrench tool, and (iii) a valve stem assembly disposed within the valve chamber, the valve stem assembly comprising a valve stem body, a valve stem attached to the valve stem body and a valve stem seal, the valve stem being movable between a retracted valve stem position and an extended valve stem position and being biased toward the extended valve stem position, the valve stem assembly being disposed within the valve chamber such that, (A) when the valve stem is in the extended valve stem position, the valve stem protrudes through the valve stem opening in the valve body cover into the valve body cover orifice and the valve stem seal is in sealing contact with the valve seat so as to seal closed the valve stem opening, and (B) when the valve stem is in the retracted valve stem position, the valve stem seal is spaced apart from the valve seat sufficient so that the valve stem opening is not sealed closed, the method comprising the steps of:

(a) disengaging the first open end of the valve body from the paint ball gun so as to expose the valve body cover orifice;

(b) pressing inwardly on the valve stem with an allen wrench tool to release any pressure within the valve body, (c) engaging the allen wrench tool within the valve body cover orifice and rotating the allen wrench tool to remove the valve body cover orifice from the valve body, so as to expose the valve stem assembly;

(d) reattaching the valve body cover to the valve body using the allen wrench tool; and (e) reattaching the first open end of the valve body in fluid tight communication with the paint ball gun.

* * * * *